(12) United States Patent
Wan et al.

(10) Patent No.: US 9,854,444 B2
(45) Date of Patent: *Dec. 26, 2017

(54) APPARATUS AND METHODS FOR PREVENTING INFORMATION DISCLOSURE

(71) Applicant: Xiaomi Inc., Beijing (CN)

(72) Inventors: Yuzhen Wan, Beijing (CN); Peng Sun, Beijing (CN); Fan Jin, Beijing (CN); Junqi Lin, Beijing (CN)

(73) Assignee: Xiaomi Inc., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/097,063

(22) Filed: Apr. 12, 2016

(65) Prior Publication Data
US 2016/0227414 A1    Aug. 4, 2016

Related U.S. Application Data

(63) Continuation-in-part of application No. 13/954,411, filed on Jul. 30, 2013, now Pat. No. 9,344,882.

(30) Foreign Application Priority Data

Aug. 31, 2012    (CN) .......................... 2012 1 0320720

(51) Int. Cl.
*H04W 12/02* (2009.01)
*H04W 12/08* (2009.01)
*H04W 4/14* (2009.01)
*H04W 12/12* (2009.01)
*H04L 29/06* (2006.01)
*H04M 1/67* (2006.01)
*H04M 1/725* (2006.01)

(52) U.S. Cl.
CPC ........... *H04W 12/08* (2013.01); *H04L 63/083* (2013.01); *H04W 4/14* (2013.01); *H04W 12/02* (2013.01); *H04W 12/12* (2013.01); *H04M 1/67* (2013.01); *H04M 1/72552* (2013.01); *H04M 1/72577* (2013.01)

(58) Field of Classification Search
CPC ..... H04W 12/08; H04W 12/02; H04W 12/12; H04W 4/14; H04L 63/083; H04M 1/67; H04M 1/72552; H04M 1/72577
See application file for complete search history.

(56) References Cited

U.S. PATENT DOCUMENTS

2003/0229534 A1    12/2003    Frangione et al.
2010/0210240 A1    8/2010    Mahaffey et al.
(Continued)

FOREIGN PATENT DOCUMENTS

CN    1859677 A    11/2006
CN    101184265 A    5/2008
(Continued)

*Primary Examiner* — Chuong A Ngo
(74) *Attorney, Agent, or Firm* — Brinks, Gilson & Lione

(57) ABSTRACT

The present application is directed to apparatuses and methods for preventing information disclosure. According to example embodiments of the present application, after a mobile terminal of a user is lost, a first short message may be sent to the mobile terminal through a short message network. When the mobile terminal determines that the received short message is the first short message, user information stored in the mobile terminal may be erased by the mobile terminal.

20 Claims, 13 Drawing Sheets

Receiving a command sent by a user for clearing user information in a mobile terminal — S201

Acquiring a type of a network connected with the mobile terminal — S202

When the mobile terminal is connected with a short message network, sending a first short message pre-arranged/pre-defined with the mobile terminal to the mobile terminal through the short message network, so that the mobile terminal executes an operation of clearing the user information in the mobile terminal — S203

(56) References Cited

U.S. PATENT DOCUMENTS

| | | | | |
|---|---|---|---|---|
| 2011/0070898 A1* | 3/2011 | Sanjeev | ................ | H04W 4/028 455/456.2 |
| 2014/0248852 A1* | 9/2014 | Raleigh | ............... | H04M 15/723 455/407 |

FOREIGN PATENT DOCUMENTS

| | | | |
|---|---|---|---|
| CN | 101389100 | A | 3/2009 |
| CN | 101594426 | A | 12/2009 |
| CN | 101616495 | A | 12/2009 |
| CN | 101720072 | A | 6/2010 |
| CN | 101772017 | A | 7/2010 |
| CN | 102075890 | A | 5/2011 |
| CN | 102196422 | A | 9/2011 |
| CN | 102231740 | A | 11/2011 |
| CN | 102368841 | A | 3/2012 |

* cited by examiner

APPARATUS AND METHODS FOR PREVENTING INFORMATION DISCLOSURE

PRIORITY STATEMENT

This application is a continuation in part of U.S. patent application Ser. No. 13/954,411, filed on Jul. 30, 2013, which is based upon and claims the benefit of Chinese Patent Application No. CN 201210320720.7, filed Aug. 31, 2012, the entire contents of which are incorporated herein by reference.

TECHNICAL FIELD

The present application relates to the field of communications. Specifically, the present application relates to apparatus and methods for preventing information disclosure.

BACKGROUND

With developments of mobile terminal technology, a mobile terminal (e.g., a wireless mobile terminal and/or a mobile phone) may provide more and more convenient functions to people, and people have increased reliance on the mobile terminal in life. Using the mobile phone as an example, the mobile phone may provide functions such as short message (e.g., a text message), conversation, photo taking, etc. In addition, a large amount of personal privacy information of a user may be stored in the mobile phone. When the mobile phone is lost or stolen, the privacy information of the user may be disclosed to a third party.

Currently, most mobile phones do not have protection mechanisms for preventing the personal privacy information of the user from being disclosed when the mobile terminal is lost, and only a small number of mobile phones adopt protection mechanisms to prevent lost mobile phones from being illegally used by persons that pick the mobile phones up.

One of the protection mechanisms is setting a protection password for an SIM (Subscriber Identity Module) card in the mobile phone. For example, when replacing the SIM card, the protection password for the SIM card must be verified. If the password has been input incorrectly more than a preset number of times, the mobile phone will be locked.

This protection mechanism only guarantees that the mobile phone of the user will not be illegally used, so as to protect the security of the personal privacy information of its owner to a certain extent. However, the personal privacy information of the user stored in the mobile phone or the card of the mobile phone is still visible to a third party if the third party keeps using the SIM card in a different unlocked phone (i.e., the SIM card is not changed). This may still cause privacy disclosure.

SUMMARY

Disclosed herein are implementations of apparatus and methods that may prevent user information from being disclosed after a mobile terminal (e.g., a wireless mobile terminal and/or a mobile phone) is lost.

According to an aspect of the present application, a mobile terminal may comprises at least one non-transitory storage medium that may comprise a set of instructions for preventing information disclosure; and at least one executing unit in communication with the storage medium that may be configured to execute the set of instructions stored in the storage medium. The executing unit may be configured to: connect the mobile terminal to a network. When the network is a short message network, the executing unit may receive a short message through the short message network; determine whether the short message is a pre-defined first short message; and erase pre-determined information stored in the mobile terminal when the short message is the first short message. When the network is an Internet network, executing unit may receive a first command sent by a server through the Internet network, wherein the first command is configured to instruct the mobile terminal to erase the pre-determined information stored in the mobile terminal; and erase the pre-determined information from the mobile terminal.

According to an aspect of the present application, to erase the pre-determined information stored in the mobile terminal the at least one executing unit may be further configured to delete the pre-determined information locally saved in the mobile terminal; and format a memory card connected with the mobile terminal.

According to an aspect of the present application, the first short message may comprise at least one of a locking password set by the user and a ciphertext corresponding to the locking password set by the user; and when the short message is the first short message, the at least one executing unit may be further configured to lock the mobile terminal in a state unavailable for any operation other than receiving and verifying the at least one of the locking password and the ciphertext.

According to an aspect of the present application, after determining that the short message is the first short message, the executing unit may be further configured to at least make a sound from the mobile terminal; or report position information of the mobile terminal to a server.

According to an aspect of the present application, the first short message may be invisible to the user.

According to an aspect of the present application a method for preventing information disclosure from a mobile terminal may comprise connecting, by a mobile terminal, the mobile terminal to a network. When the network is a short message network, the method may comprise receiving, by a mobile terminal, a short message; determining, by a mobile terminal, whether the short message is a pre-defined first short message. When the short message is the first short message, the method may comprise erasing, by a mobile terminal, pre-determined information stored in the mobile terminal. When the network is an Internet network, the method may comprise receiving, by a mobile terminal, a pre-defined first command sent by a server through the Internet network, wherein the first command may be configured to instruct the mobile terminal to erase the pre-determined information stored in the mobile terminal. Further, the method may comprise erasing, by a mobile terminal, the pre-determined information from the mobile terminal.

According to an aspect of the present application, erasing the pre-determined information may comprise deleting the pre-determined information locally saved in the mobile terminal; and formatting a memory card connected with the mobile terminal.

According to an aspect of the present application, the first short message may comprise at least one of a locking password set by a user and a ciphertext corresponding to the locking password set by the user; and the method may further comprise, when the short message is the first short message, locking, by a mobile terminal, the mobile terminal in a state unavailable for any operation other than receiving and verifying the at least one of the locking password and the ciphertext.

According to an aspect of the present application, when the short message is the first short message, the method may further comprise performing, by a mobile terminal, at least one of the acts of: making a sound from the mobile terminal; and reporting position information of the mobile terminal to a server.

According to an aspect of the present application, the first short message may be invisible to the user.

According to an aspect of the present application, a server may comprise at least one non-transitory storage medium that may comprise a set of instructions for preventing information disclosure; at least one executing unit in communication with the storage medium that may be configured to execute the set of instructions stored in the storage medium and may be configured to receive a command from a user for erasing pre-determined information stored in a mobile terminal; establish a network connection with the mobile terminal; and send a pre-defined instruction to the mobile terminal through the network connection, instructing an operation of erasing the pre-determined information stored in the mobile terminal.

According to an aspect of the present application, when the network connection is a short message network, the pre-defined instruction may a pre-defined first short message; when the network connection is an Internet network connection, the pre-defined instruction may be a pre-defined first command.

According to an aspect of the present application, the at least one executing unit may be further configured to receive a locking password from the user for locking the mobile terminal, wherein the locking password is configured to command the mobile terminal to switch into a state unavailable for any operation command other than receiving and verifying the locking password or a ciphertext of the locking password.

According to an aspect of the present application, the at least one executing unit may be further configured to add the locking password into the pre-defined instruction in a pre-defined format.

According to an aspect of the present application, the at least one executing unit may be further configured to encrypt the locking password into a ciphertext; and add the ciphertext corresponding to the locking password into the pre-defined instruction in a pre-defined format.

According to an aspect of the present application, the at least one executing unit may be further configured to receive identification information of the user; and search a telephone number associated with the user.

According to an aspect of the present application, the at least one executing unit may be further configured to verify a relationship between the telephone number and the mobile terminal by sending a verification message to the mobile terminal through the telephone number; and save the relationship between the identification information and the telephone number after the telephone number is verified.

According to an aspect of the present application, the at least one executing unit may be further configured to receive position information of the mobile terminal sent by the mobile terminal in response to the pre-defined instruction.

According to an aspect of the present application, a method for preventing information disclosure from a mobile terminal may comprise receiving, by a server, a command from a user for erasing pre-determined information stored in a mobile terminal; establishing, by a server, a network connection with the mobile terminal; and sending, by a server, a pre-defined instruction to the mobile terminal through the network connection, instructing the mobile terminal to perform an operation of erasing the pre-determined information stored in the mobile terminal.

According to an aspect of the present application, when the network connection is a short message network, the pre-defined instruction may be a pre-defined first short message; when the network connection is an Internet network connection, the pre-defined instruction may be a pre-defined first command.

According to an aspect of the present application, the method may further comprise receiving, by a server, a locking password from the user for locking the mobile terminal, wherein the locking password may be configured to command the mobile terminal to switch into a state unavailable for any operation command other than receiving and verifying the locking password or a ciphertext of the locking password.

According to an aspect of the present application, the method may further comprise adding, by a server, the locking password into the pre-defined instruction in a pre-defined format.

According to an aspect of the present application, the method may further comprise encrypting, by a server, the locking password into the ciphertext; and adding, by a server, the ciphertext corresponding to the locking password into the pre-defined instruction in a pre-defined format.

According to an aspect of the present application, the method may further comprise receiving, by a server, identification information of the user; and searching, by a server, a telephone number associated with the user.

According to an aspect of the present application, the method may further comprise verifying, by a server, a relationship between the telephone number and the mobile terminal by sending a verification message to the mobile terminal through the telephone number; and saving, by a server, the relationship between the identification information and the telephone number after the telephone number is verified.

According to an aspect of the present application, the method may further comprise receiving, by a server, position information of the mobile terminal sent by the mobile terminal in response to the short message.

BRIEF DESCRIPTIONS OF THE DRAWINGS

Embodiments described below may be more fully understood by reading the following description in conjunction with the drawings, in which.

DETAILED DESCRIPTIONS OF THE EXAMPLE EMBODIMENTS

Figure 1:
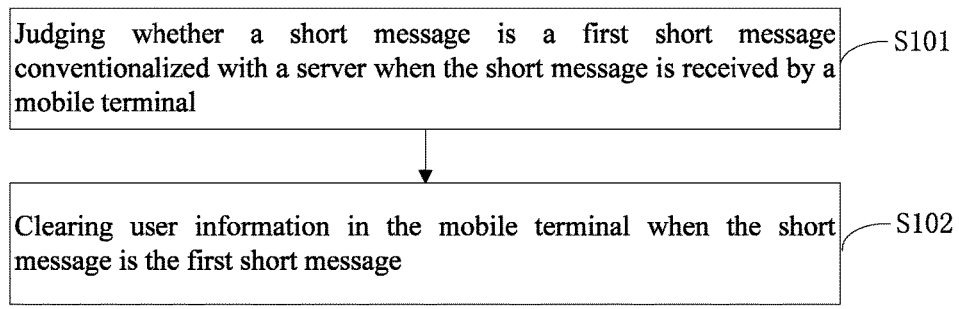
FIG. 1 illustrates a method for preventing information disclosure according to example embodiments of the present application.

Example embodiments will now be described more fully with reference to the accompanying drawings, in which the example embodiments are shown. The example embodiments may, however, be embodied in many different forms and should not be construed as being limited to the preferred embodiments set forth herein; rather, the example embodiments are provided so that this application will be thorough and complete, and will fully convey the concept of the invention to one skilled in the art. The drawings may be exaggerated for clarity and may not be necessarily to scale. Like reference numerals in the drawings denote like elements, and thus, their description will not be repeated.

Figure 18:
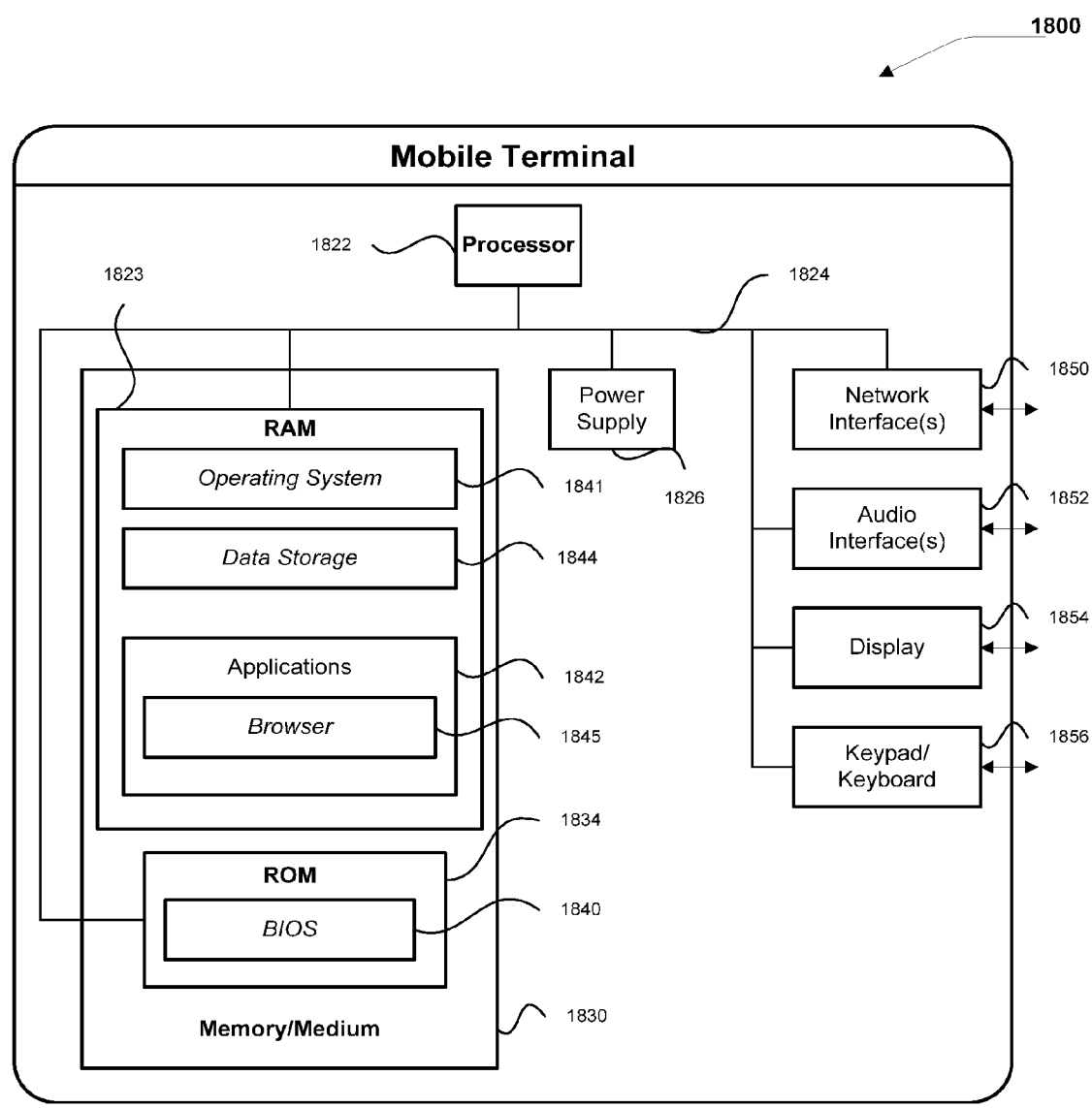
FIG. 18 is a schematic diagram illustrating an example embodiment of a mobile terminal.

FIG. 18 is a schematic diagram illustrating an example embodiment of a mobile terminal. A mobile terminal 1800 may include a computing device capable of sending or receiving signals, such as via a wired or a wireless network. The mobile terminal 1800 may, for example, be a portable device, such as a cellular telephone or a smart phone, a display pager, a radio frequency (RF) device, an infrared (IR) device, a Personal Digital Assistant (PDA), a handheld computer, a tablet computer, a set top box, a wearable computer, an integrated device combining various features, such as features of the forgoing devices, or the like.

The mobile terminal 1800 may vary in terms of capabilities or features. Claimed subject matter is intended to cover a wide range of potential variations. For example, the mobile terminal 1800 may include a keypad/keyboard 1856 or a display 1854, such as a liquid crystal display (LCD) and/or a display with a high degree of functionality, such as a touch-sensitive color 2D or 3D display. In contrast, however, as another example, a web-enabled mobile terminal 1800 may include one or more physical or virtual keyboards, mass storage medium, and/or a global positioning system (GPS) or other location-identifying type capability.

The mobile terminal 1800 may also include or may execute a variety of operating systems 1841, including an operating system, such as a Windows™ or Linux™, or a mobile operating system, such as iOS™ Android™, or Windows Mobile™, or the like. A mobile terminal 1800 may include or may execute a variety of possible applications 1842, such as a browser 1845. An application 1842 may enable communication with other devices, such as communicating one or more messages, such as via email, short message service (SMS), or multimedia message service (MMS), including via a network, such as a short message network or an Internet network, including, for example, Facebook™, LinkedIn™ Twitter™, Flickr™, or Google™.

Further, the mobile terminal 1800 may include one or more non-transitory processor-readable and/or processor-readable storage media 1830 and one or more processors 1822 in communication with the non-transitory processor-readable and/or processor-readable storage medium 1830. The one or more non-transitory processor-readable and/or processor-readable storage media 1830 may store sets of instructions and/or modules that comprise the sets of instructions for conducting operations of the mobile terminal 1800. The one or more processors may be configured to execute the sets of instructions and perform the operations on the mobile terminal 1800.

Figure 19:
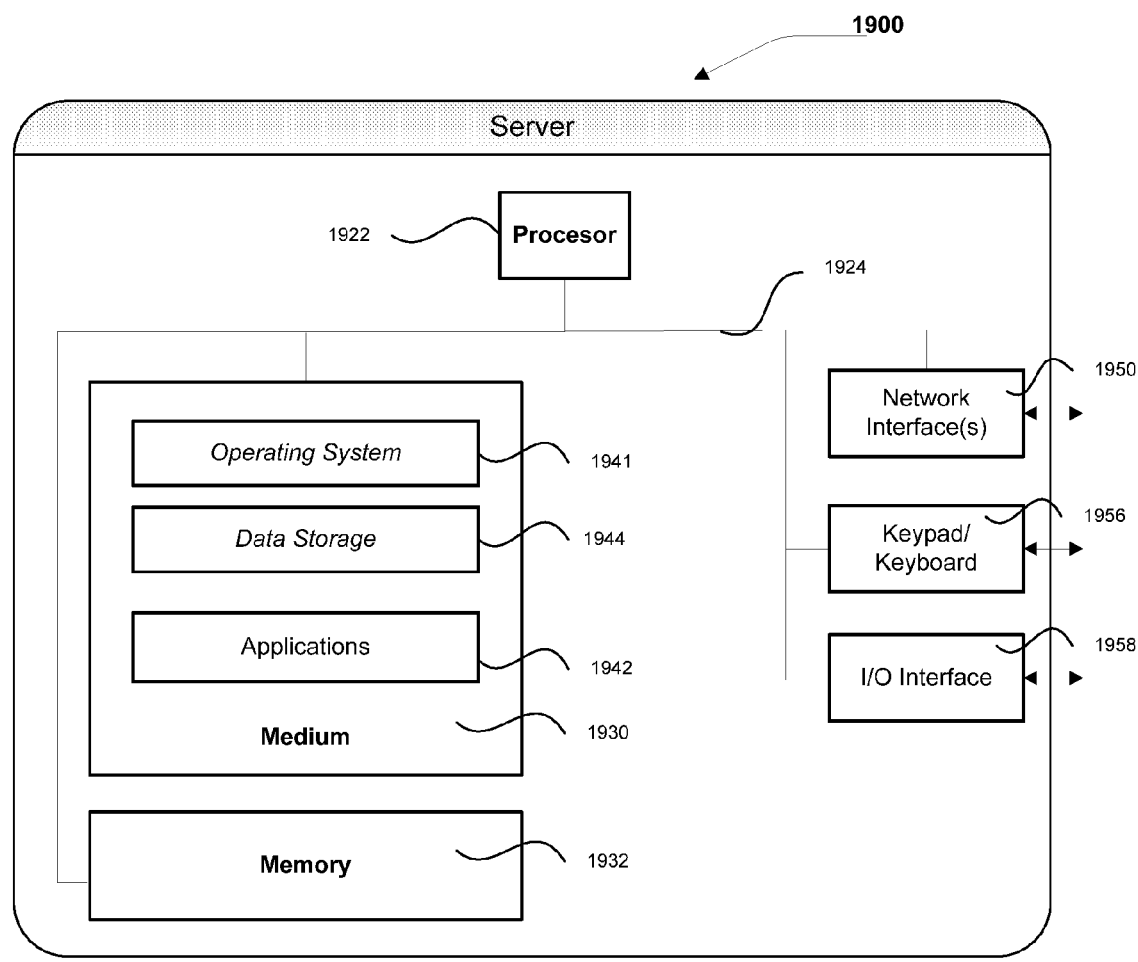
FIG. 19 is a schematic diagram illustrating an example embodiment of a server.

FIG. 19 is a schematic diagram illustrating an example embodiment of a server. A server 1900 may vary widely in configuration or capabilities, but it may include one or more central processing units 1922 (e.g. one or more processors) and memories 1932, one or more storage media 1930 (such as one or more mass storage devices) storing application programs 1942 or data 1944. The one or more memories 1932 and media 1930 may be transitory or non-transitory. The programs stored in the one or more storage media 1930 may include one or more modules (not shown). Each module may include a set of instructions for operations on the server. Further, the central processing units 1922 may be configured to communicate with the storage medium 1930 and execute the sets of instructions and perform the operations on the server 1900.

The server 1900 may also include one or more power supplies 1926, one or more wired or wireless network interfaces 1950, one or more input/output interfaces 1958, and/or one or more operating systems 1941, such as Windows Server™, Mac OS X™, Unix™, Linux™, FreeBSD™, or the like.

According to an exemplary embodiment of the present disclosure, when a lost mobile terminal is being connected via the short message network, and/or is not able to access a WiFi, a user of the lost mobile terminal may send a special short message to the lost mobile terminal to lock the lost mobile terminal. By receiving the special short message, the mobile terminal may conduct a lock operation. As a result, the lost mobile terminal may lock itself and turn itself into a state unavailable for any operation other than receiving and verifying an locking password. To further prevent leaking of information stored in the lost mobile terminal, upon receipt of the short message, the lost mobile terminal may also erase predetermined information saved therein or even completely format a predetermined storage medium of the lost mobile terminal. This method may be implemented in the mobile terminal when there is no WiFi available to the mobile terminal. Since the coverage of the short message network is very wide, it may ensure the above transmitting and receiving of the message or instruction as soon as possible.

In the event that short message is not available, such as the SIM card of the lost mobile terminal has been pulled out, the mobile terminal cannot receive a short message at all. But as long as the Internet connection is available, the lost mobile terminal is still able to connect to the Internet network directly or via WiFi. In this scenario, the lost mobile terminal may receive an Internet command to lock the mobile terminal into a state unavailable for any operation other than receiving and verifying an unlocking password and/or erase the pre-determined information stored in the lost mobile terminal.

The methods and systems in the present disclosure may give priority to the short message network or the Internet network as a main channel to lock the mobile terminal, and taking the other one as a backup channel to lock the mobile terminal. With the dual protection mechanism, even if one channel is not available to the lost mobile terminal, there is still some possibility to prevent the personal privacy information of a user stored in the lost mobile terminal from being leaked.

Accordingly, the above substantive dual transmission measure adopted by the present disclosure is not a simple superimposing of transmitting and receiving via a short message network and an Internet network, but a determination mechanism and composition of steps to prevent the personal privacy information of a user from being disclosed after a mobile terminal is lost, in an unexpected cheap and efficient way.

FIG. 1 illustrates a method reflecting the above implementation, which may be executed by a processor of a mobile terminal for preventing information disclosure according to example embodiments of the present application. The method may be implemented in the mobile terminal 1800 by a program during detailed implementation. For example, the program may be stored in the non-transitory processor-readable storage medium 1830; the program may also be installing software in the mobile terminal or may be integrated into an operating system of the mobile terminal. The mobile terminal may be an executive body to the program according to example embodiments of the present application.

When the mobile terminal is connected with a short message network, the method may comprise:

At S101, determining, by the processor 1822, whether a short message is a first short message that is pre-arranged and/or pre-defined between the mobile terminal 1800 and a server when the short message is received by the mobile terminal 1800.

To this end, the mobile terminal 1800 may connect to an Internet network directly and surf on the Web, the mobile terminal may also connect to short message networks to send and receive short messages. The wide availability of existing networks from commercial operators provides a wider range of regions for a user to connect to short message network. Therefore, if the Internet is not available, the user may still protect his/her personal information stored in a mobile terminal via short message networks after the mobile terminal is lost.

At S102, erasing, by the processor 1822, user information saved in the mobile terminal 1800 when the short message is the first short message. Thus the first short message may serve as an instruction that instruct and/or trigger the processor to perform the erasing operation. For example, the first short message may be a short code and/or program received by the mobile terminal in a form of short message (e.g., text message). The short code and/or program may be executable by the operation system of the mobile terminal. The first short message may also be a command received by the mobile terminal in a form of short message (e.g., text message). The command may trigger an erasing operation pre-loaded in the mobile terminal. The short message may be transmitted visa a short message network. Alternatively, the short message may be downloaded via an Internet network.

Erasing the user information saved in the mobile terminal may comprise deleting, by the processor 1822, the user information locally saved in the mobile terminal, and formatting, by the processor, a memory card connected with the mobile terminal. The memory card may be part of the processor-readable storage medium 1830. Here, a locking password set by the user and/or a ciphertext corresponding to the locking password set by the user may be carried in the first short message.

When the short message is the first short message, the method may further comprise locking the mobile terminal by the processor 1822, so that the mobile terminal 1800 may be set in a state that is unavailable for any operations (e.g., the mobile terminal may be unavailable to be used by any persons) until the processor 1822 of the mobile terminal receiving and successfully verifying the locking password inputted by the user.

Further, the method may comprise, when the mobile terminal is connected with the Internet network, receiving, by the processor 1822, a first command sent by the server through the Internet network; and clearing the user information in the mobile terminal, wherein, the first command is configured to instruct the mobile terminal to clear and/or erase the user information saved in the mobile terminal. The user information may be predetermined and/or predefined by the user. For example, the user may pre-set the mobile terminal to erase certain information saved in certain folder as user information. When the user does not pre-set the user information, the mobile terminal may erase information under a default way. Typically the mobile terminal may reset itself to its original setting and erase all information stored after the mobile terminal was purchased.

The first short message in the example embodiment may be invisible to the user.

Further, when the short message is the first short message, the method may comprise making, by the processor 1822, a sound from the mobile terminal and/or reporting position information of the mobile terminal to the server.

Figure 2:
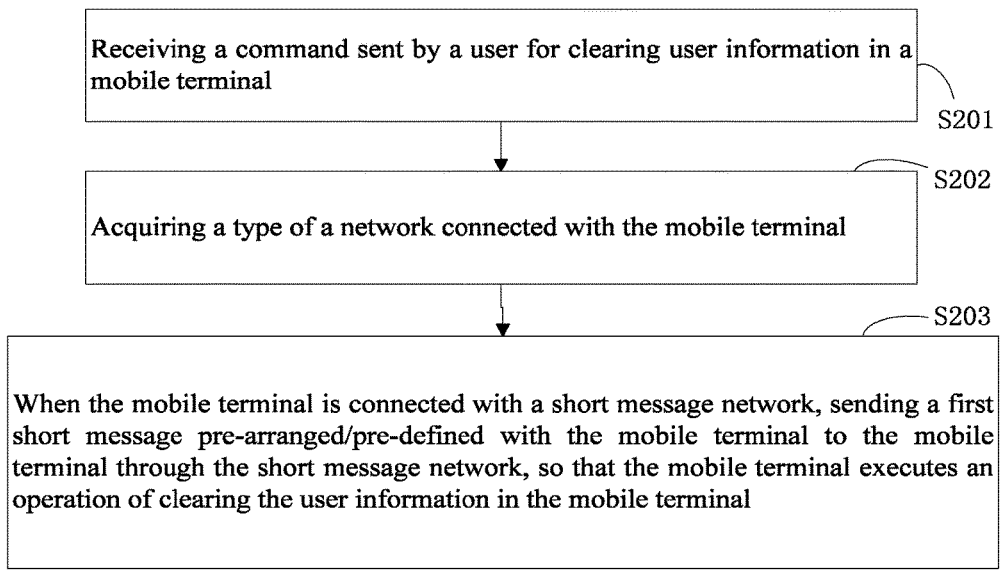
FIG. 2 illustrates another method for preventing information disclosure according to the example embodiments of the present application.

FIG. 2 illustrates a method executed by a processor of a server for preventing information disclosure according to the example embodiments of the present application. For example, the method may be implemented in the server 1900. The method may comprise:

At S201, receiving, by a processor of the server, a command sent by a user for clearing and/or erasing user information saved in a mobile terminal. The command may be sent by the user from another mobile terminal over a network. It may also be sent from other forms of computer device over the network.

At S202, establishing a network connection with the mobile terminal. The network connected with the mobile terminal in the example embodiment may comprise a short message network and/or an Internet network.

At S203, when the mobile terminal is connected with the short message network, sending, by a processor of the server, a first short message that is pre-arranged and/or pre-defined between the mobile terminal and the server to the mobile terminal through the short message network. The first short message may instruct the mobile terminal to execute an operation of clearing and/or erasing the user information stored in the mobile terminal accordingly.

When the processor of the server receives the command sent by the user for clearing and/or erasing the user information stored in the mobile terminal the method may further comprise receiving, by a processor of the server, a locking password inputted by the user, wherein the locking password may be used to lock the mobile terminal.

Accordingly, the method may further comprise: before sending the first short message pre-arranged and/or pre-defined with the mobile terminal to the mobile terminal through the short message network, adding, by a processor of the server, the locking password into the first short message in a format pre-arranged and/or pre-defined with the mobile terminal, and/or implementing, by a processor of the server, encryption operations on the locking password so as to obtain a ciphertext corresponding to the locking password, and adding the ciphertext corresponding to the locking password into the first short message in a format pre-arranged and/or pre-defined with the mobile terminal.

When the mobile terminal is connected with the Internet network, the method may comprise sending, by a processor of the server, a first command to the mobile terminal through the Internet network. The first command may instruct the mobile terminal to execute an operation of clearing and/or erasing the user information in the mobile terminal.

Further, before sending the first short message pre-arranged and/or pre-defined with the mobile terminal to the mobile terminal through the short message network, the method may also comprise searching, by a processor of the server according to identification information inputted by the user in advance, a telephone number corresponding to the identification information.

Accordingly, the method may further comprise: before receiving, by a processor of the server, the command sent by the user for clearing the user information in the mobile terminal; receiving, by a processor of the server, the identification information inputted by the user and the telephone number, and sending, by a processor of the server, a verification message to the mobile terminal through the telephone number so as to verify the telephone number; and saving, by a processor of the server, a corresponding relationship between the identification information inputted by the user and the telephone number after the telephone number is verified.

Further, the method may comprise: before sending the first short message pre-arranged and/or pre-defined with the mobile terminal to the mobile terminal through the short message network, receiving, by a processor of the server, position information of the mobile terminal sent by the mobile terminal.

FIGS. 1-2 illustrate methods of locking a mobile terminal (e.g., when the mobile terminal is lost) through a short message network. In the event that the short message network is not available, or when a SIM card of the mobile terminal is pulled out form the mobile terminal, a user may also lock the mobile terminal, as long as the mobile terminal is connected to the Internet.

According to an exemplary embodiment of the present disclosure, when the mobile terminal is connected to the Internet network, the user of the mobile terminal may send an instruction (or command) of locking the mobile terminal and/or erasing the pre-determined information stored in the mobile terminal via the Internet network. Thus even when the mobile terminal does not include a SIM card, thereby cannot receive the special short message to lock itself, the mobile terminal may still have an alternative way to prevent important information of a user stored in the lost mobile terminal from being disclosed to others by doing the dual transmission measure (dual protection mechanism through the short message and Internet instruction).

Figure 3:
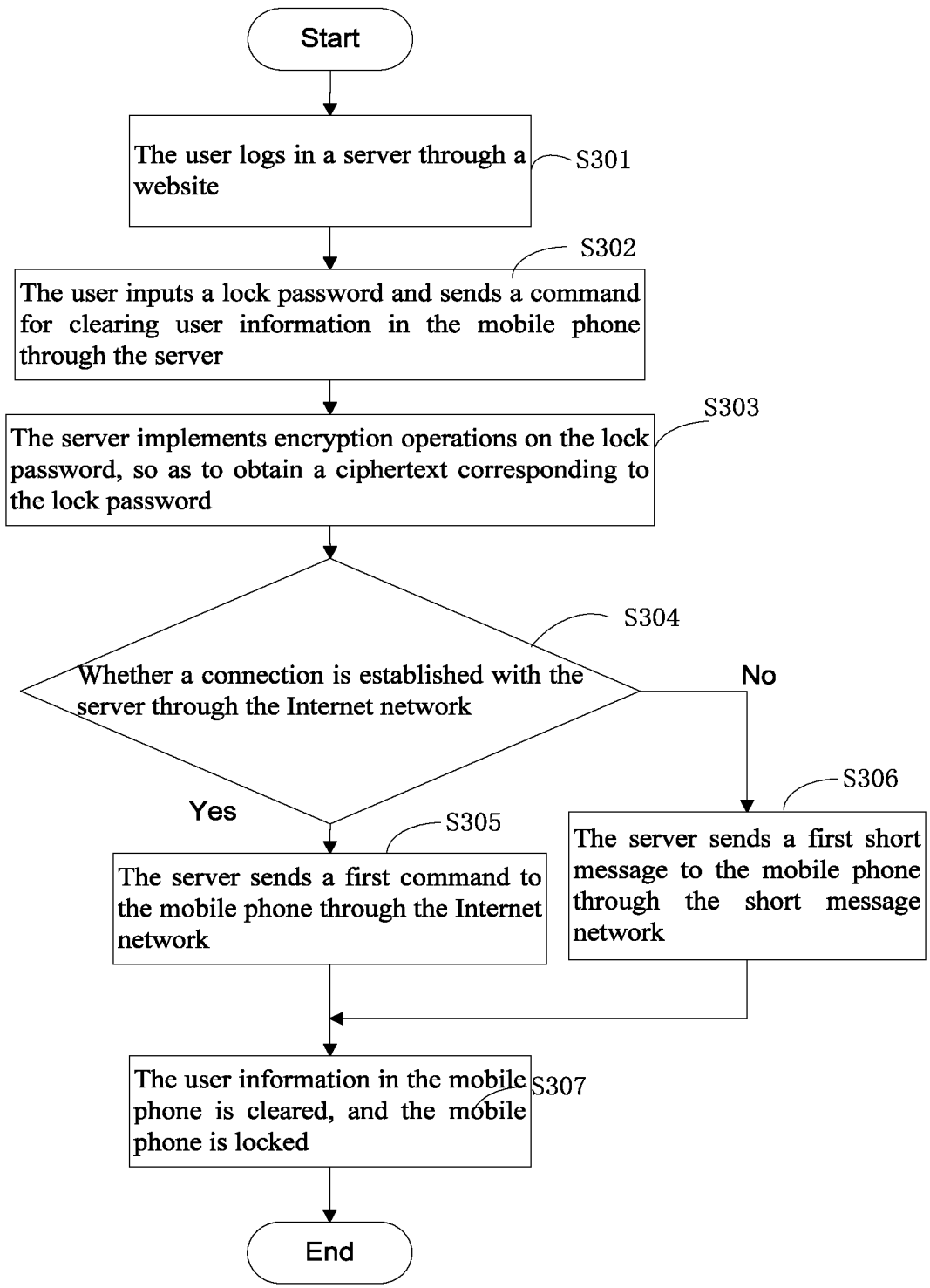
FIG. 3 illustrates another method for preventing information disclosure according to the example embodiments of the present application.

FIG. 3 illustrates a flow diagram of implementing the above method of preventing information disclosure according to an example embodiment of the present application. In the example embodiment, a mobile phone is used as an example of the mobile terminal for descriptions; when the mobile phone of a user is lost, the method comprises:

At S301, the user logs in a server through a website.

Specifically, the process of logging in the server through the website may comprise a process of verifying identification information of the user conducted by the server. To this end, the following procedures may be adopted:

The user may input a personal account and a password of the account, and then the server may verify the account and the password inputted by the user. If the account and the password inputted by the user match, the verification is confirmed and the user may log in the server; if the account and the password inputted by the user fail to match each other, then the verification may fail. The user may not log in the server and the server may stop the login operation.

Further, after the mobile phone is lost but before the user uses a function of preventing information disclosure provided by the server, the user may register an account at the server, associate and/or bind the personal account with a mobile phone number, so that the server may record a corresponding relationship between the account of the user and the mobile phone number.

The following procedures may be adopted for associating and/or binding the personal account with the mobile phone number. The user may input the personnel account and the mobile phone number through the website, and the server may send a verification short message to the mobile phone number. For example, the short message may comprise a verification password. After receiving the short message, the user may input the verification password through the website. If the verification is confirmed, e.g., the personal account number matches with the password, then the association and/or binding may be successful.

Alternatively, the following procedures may be adopted for associating and/or binding the personal account with the mobile phone number. After the user inputs the personnel account and the mobile phone number through the website, the website may require the user send a pre-arranged and/or pre-defined message (for example: an account name of the user plus an association and/or binding instruction) via the mobile phone to a phone number designated by the server. If the server receives the pre-arranged and/or pre-defined message from the mobile phone, the association and/or binding may be successful.

At S302, the user may input a locking password and send a command for clearing and/or erasing user information in the mobile phone through the server, wherein the locking password may be used for locking the mobile phone, so that the mobile phone is unable to execute any other operations except verifying the lock password. The mobile phone may resume normal functionality after receiving the correct unlocking password. In the example embodiments of the present application, the unlocking password may be the same as the locking password, i.e., the locking password may lock the mobile phone if the mobile terminal is unlocked; the same locking password may also be used to unlock the mobile phone if the mobile terminal is locked. Alternatively, the unlocking password may differ from the locking password.

At S303, the server may implement encryption operations on the lock password, so as to obtain a ciphertext corresponding to the lock password. For example, a hash algorithm such as MD5 (Message-Digest Algorithm 5) may be used to encryption the password, and the ciphertext corresponding to the lock password may relate to MD5 value of the lock password.

The hash algorithm may be an irreversible encryption algorithm. Thus the encrypted password may not be deciphered even if the encrypted password or the message containing the encrypted password is intercepted.

At S304, a processor of the server may determine whether a connection is established between the mobile phone and the server through the Internet network. For example, the server may send a connection status inquiry to the mobile phone via the Internet network. The mobile phone may respond to the connection status inquiry if the mobile phone is connected to the network.

Accordingly, if the server receives a response to the inquiry within a pre-determined period of time, the server may determine that a connection is established between the mobile phone and the server through the Internet network; if the server does not receive a response to the inquiry within a pre-determined period of time, the server may determine that no such connection is established. If the connection is established, then the server may execute step S305; if not, then the server may execute step S306.

Establishing the connection between the mobile phone and the server through the Internet network may comprise: establishing a network connection by the mobile phone (e.g., by a processor of the mobile phone) through a PS (Packet Switch) domain service provided by an operator of the Internet network, or through a network connection by such wireless networks as WiFi (Wireless-Fidelity), etc.

Determining whether the connection is established between the mobile phone and the server through the Internet network may comprise searching, by a processor of the server, a mobile phone corresponding to the account of the user, and judging, by a processor of the server, whether a network channel has been established between the mobile phone and the server. If the network channel has been established, the server may conclude that the connection is established between the mobile phone and the server through the Internet network. The mobile phone may maintain the connection with the server through the Internet network connection after the user enables the function of preventing information disclosure. The connection may be a TCP (Transmission Control Protocol) connection.

At S305, the server may send a first command to the mobile phone through the Internet network to execute step S307. The first command may be used for instructing the mobile phone to clear and/or erase the user information. The user information may be the entire content saved in a non-transitory storage medium of the mobile terminal, or may be a portion of predetermined information. The predetermined information may be default information stored in the storage medium, or may be predetermined by the user of the mobile terminal. For example, the user may pre-selection certain information saved in certain folder of the storage medium as user information. Before sending the first command to the mobile phone, the server may add the lock password into the first command in a format pre-arranged and/or pre-defined with the mobile phone, so that the mobile phone after receiving the first command may clear and/or erase the user information, and may use the lock password to lock the mobile phone.

At S306, the server may send a first short message to the mobile phone through the short message network to execute S307. The short message network may comprise a network corresponding to a CS (Circuit Switched) domain provided by the operator or a network in LET (Long Term Evolution) networks used for taking charge of short message services. The first short message may be used for instructing the mobile phone to clear and/or erase the user information saved therein, and a format of the first short message may be arranged and/or defined in advance with the mobile phone by the server.

Every time when the mobile phone receives a short message, the mobile phone may first determine if the received short message is the first short message. If the short message is the first short message, the mobile phone may execute step S307; if the short message is not the first short message, the mobile phone may display and process the received short message as a common short message.

The mobile phone may determine whether the received short message is the first short message through the format of the short message and/or contents in the short message. For example, the format of the first short message may be pre-arranged and/or pre-defined between the server and the mobile phone in advance. When the mobile phone analyzes the received short message and finds that the short message satisfies the format requirement of the first short message, the mobile phone may determine that the received short message is the first short message.

To determine whether the received short message is the first short message through the content in the short message, an identifier (such as the phone number of the first short message sender) of the first short message is pre-arranged and/or pre-defined between the server and the mobile phone in advance. When the mobile phone analyzes the received short message and finds that the identifier pre-arranged and/or pre-defined in advance is included in the short message, the mobile phone may determine that the received short message as the first short message.

Accordingly, before sending the pre-arranged and/or pre-defined first short message to the mobile phone, the server may add the lock password into the first short message in the format pre-arranged and/or pre-defined with the mobile terminal, so that the mobile phone after receiving the first short message may clear and/or erase the user information stored therein, and may use the ciphertext corresponding to the lock password to lock the mobile phone.

In addition, the first short message may not be visible to the user.

As a result, once the mobile phone is lost and locked, a person who picks up the mobile phone may be prevented from discovering the first short message and/or taking action to prevent the operation of clearing and/or erasing the user information saved in the mobile phone.

At S307, the processor of the mobile phone may clear and/or erase the user information saved in the mobile phone and lock the mobile phone.

For example, the processor may clear and/or erase the user information locally stored in a processor-readable storage medium (e.g., a non-transitory memory and/or a memory card) of the mobile phone and formatting the processor-readable storage medium of the mobile phone. The user information to be cleared and/or erased may comprise information related to personal privacy of the user, such as short messages, address book, and pictures. For example, the processor may clear and/or erase the user information by resetting the mobile phone to a state as the mobile phone was first purchased and delivered.

For Example, the processor may lock the mobile phone by setting the mobile phone into a screen locking state, so that the mobile phone is unable to carry out any other operations except verifying a password for unlocking the screen. To verify a screen locking password, the mobile phone may receive a screen locking password inputted by the user, implement encryption operations on the screen locking password to obtain a new ciphertext, compare the new ciphertext with the ciphertext corresponding to a screen locking password carried in the first short message or the first command, and release the screen locking state if the two ciphertexts are the same.

In the event that the mobile phone is under a shutdown state (e.g., the mobile phone is turned off) and thereby is unable to receive the first short message when the first short message is sent, the processor of the mobile phone may enable an operation of judging whether the short message is the first short message when the mobile phone receives the short message after startup, and the processor may execute an operation of clearing and/or erasing the user information if the short message is the first short message.

According to the example embodiment, after the mobile phone receives the first short message or the first command, the processor of the mobile phone may make a sound (e.g., a beep sound, a ring tong, and/or a piece of music) from the mobile phone or report position information of the mobile phone to the server. To this end, an instruction for making the sound may be carried in the first short message or the first command, and the mobile phone may make the sound according to the instruction so that the owner of the mobile phone may find the position of the mobile phone through the sound.

The first short message or first command may further carry an instruction for making the mobile phone to report position information, and the position information of the mobile phone may be obtained through a positioning function of the mobile phone, such as positioning based on a base station or positioning based on GPS. For example, the position information of the mobile phone may be longitude and latitude positions of the mobile phone that are obtained by positioning based on GPS, or a position of the base station at which the mobile phone is located.

Figure 4:
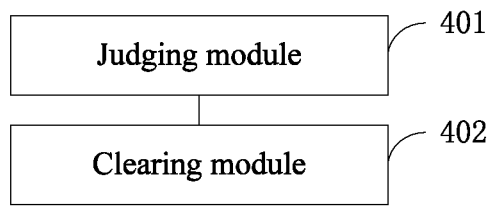
FIG. 4 illustrates a first schematic diagram of a device for preventing information disclosure according to the example embodiments of the present application.

FIG. 4 illustrates a first schematic diagram of a device for preventing information disclosure according to an example embodiment of the present application. For example, the device may be a non-transitory processor-readable storage medium, which includes a plurality of modules stored therein. Each module may include a set of instructions for operations on a mobile terminal. A central processing unit or a server or a processor of the mobile terminal may be configured to communicate with the device and execute the sets of instructions and perform the operations.

The device may comprise a judging module 401, configured to judge whether a short message is a first short message pre-arranged and/or pre-defined with a server when the short message is received by a mobile terminal. Further, the device may also comprise a clearing module 402, configured to clear and/or erase user information stored in the mobile terminal when the short message is determined as the first short message by the judging module 401.

Figure 5:
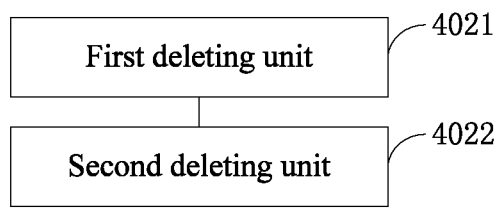
FIG. 5 illustrates a schematic diagram of a clearing module in the device for preventing information disclosure according to the example embodiments of the present application.

FIG. 5 illustrates a schematic diagram of a clearing module 402 in the device for preventing information disclosure according to an example embodiment of the present application. As shown in FIG. 5, the clearing module 402 may comprise a first deleting unit 4021, configured to delete the user information locally saved in the mobile terminal; and a second deleting unit 4022, configured to format a memory card connected with the mobile terminal.

Figure 6:
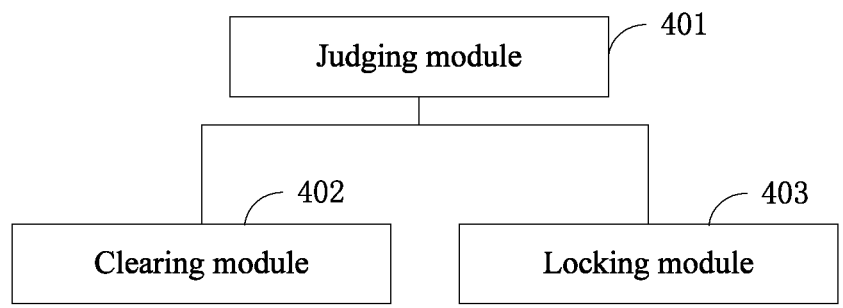
FIG. 6 illustrates a second schematic diagram of the device for preventing information disclosure according to the example embodiments of the present application.

Further, a locking password set by the user or a ciphertext corresponding to the locking password set by the user may be carried in the first short message. FIG. 6 illustrates a second schematic diagram of the device for preventing information disclosure according to an example embodiment of the present application. In addition to the modules shown in FIG. 5, the device may further comprise a locking module 403 configured to lock the mobile terminal, so that when the short message is the first short message, the mobile terminal may be in an unavailable state (e.g., the mobile terminal may be in a state that all functionalities are turned off except the function of verifying the locking password) before receiving and successfully verifying the locking password inputted by the user.

Figure 7:
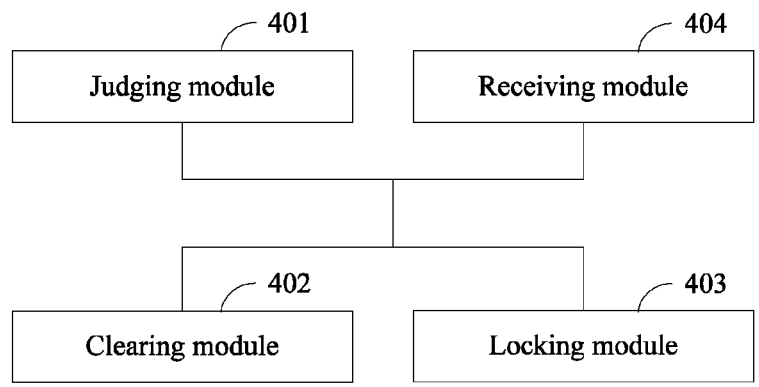
FIG. 7 illustrates a third schematic diagram of the device for preventing information disclosure according to the example embodiments of the present application.

FIG. 7 illustrates a third schematic diagram of the device for preventing information disclosure according to an example embodiment of the present application. In addition to the modules shown in FIG. 6, the device may further comprise a receiving module 404, configured to receive a first command sent by the server through the Internet network when the mobile terminal is connected with an Internet network. Accordingly, the clearing module 402 may be further configured to clear and/or erase the user information stored in the mobile terminal after the receiving module 403 receives the first command sent by the server through the Internet network, wherein the first command may be configured to instruct the mobile terminal to clear and/or erase the user information in the mobile terminal.

Figure 8:
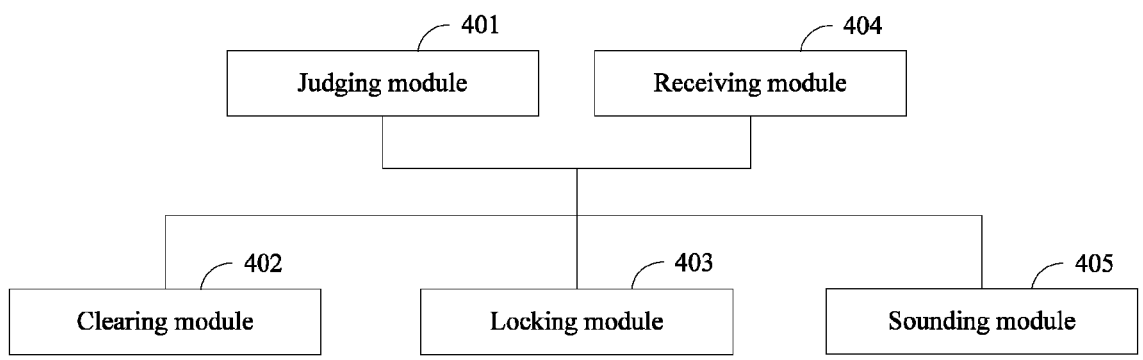
FIG. 8 illustrates a fourth schematic diagram of the device for preventing information disclosure according to the example embodiments of the present application.
Figure 9:
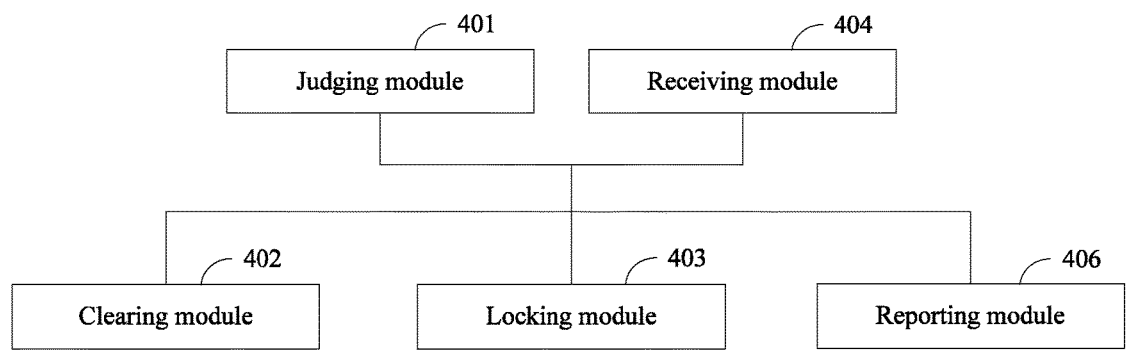
FIG. 9 illustrates a fifth schematic diagram of the device for preventing information disclosure according to the example embodiments of the present application.

FIGS. 8-9 respectively illustrate a fourth schematic diagram and a fifth schematic diagram of the device for preventing information disclosure according to example embodiments of the present application. In addition to the modules shown in FIG. 7, the device may further comprise a sounding module 405, as shown in FIG. 8, configured to make a sound from the mobile terminal when the short message is determined as the first short message by the judging module 401. Alternatively, as shown in FIG. 9, the device may further comprise a reporting module 406, configured to report position information of the mobile terminal when the judging module determines that short message is the first short message.

Further, the first short message may be invisible to the user.

As a result, once the mobile phone is lost, a person who picks up the mobile phone may be prevented from discovering the first short message and/or taking action to prevent the operation of clearing and/or erasing the user information saved in the mobile phone.

Figure 10:
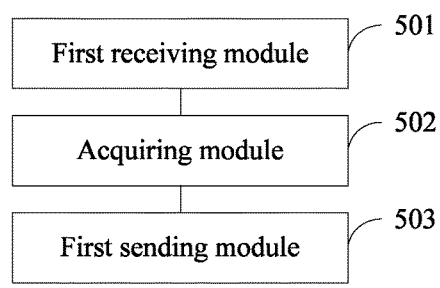
FIG. 10 illustrates a first schematic diagram of a server for preventing information disclosure according to the example embodiments of the present application.

Example embodiments of the present application further provide a server for preventing information disclosure. FIG. 10 illustrates a first schematic diagram of a server (e.g., the server 1900 in FIG. 19) for preventing information disclosure according to an example embodiment of the present application. The server may comprise a first receiving module 501, configured to receive a command sent by a user for clearing user information in a mobile terminal; an acquiring module 502, configured to establish a network connection with the mobile terminal; and a first sending module 503, configured to send a first short message pre-arranged and/or pre-defined with the mobile terminal to the mobile terminal through a short message network when the network connection is a short message network. The first short message may instruct the mobile terminal to execute an operation of clearing and/or erasing the user information stored in the mobile terminal.

Figure 11:
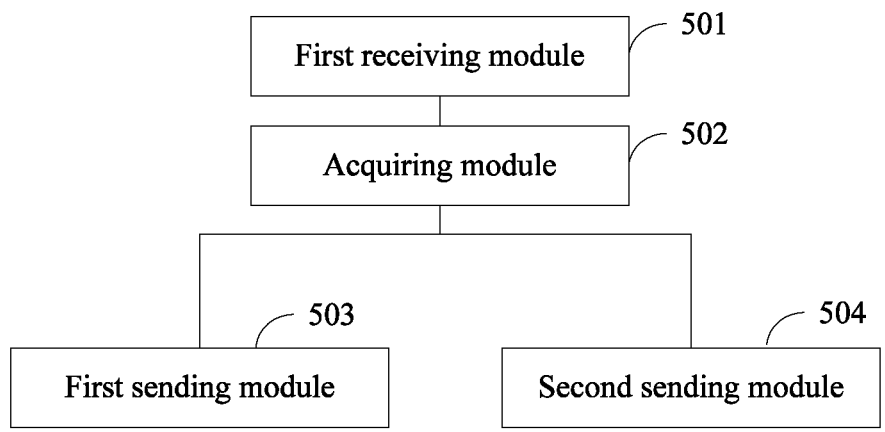
FIG. 11 illustrates a second schematic diagram of the server for preventing information disclosure according to the example embodiments of the present application.

FIG. 11 illustrates a second schematic diagram of the server for preventing information disclosure according to an example embodiment of the present application. In addition to the modules shown in FIG. 10, the server may also comprise a second sending module 504, configured to send a first command to the mobile terminal through an Internet network when the network connection is an Internet network. The first command may instruct the mobile terminal to execute the operation of clearing and/or erasing the user information stored in the mobile terminal.

Figure 12:
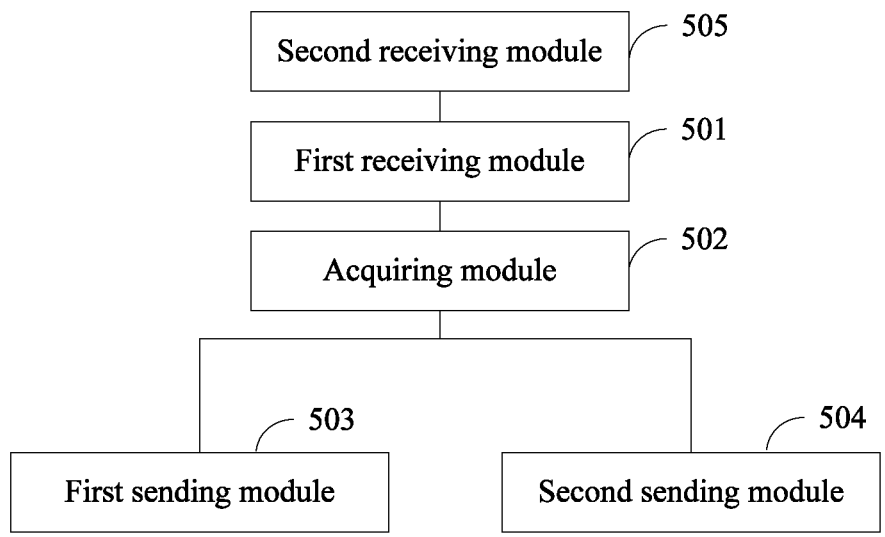
FIG. 12 illustrates a third schematic diagram of the server for preventing information disclosure according to the example embodiments of the present application.

FIG. 12 illustrates a third schematic diagram of the server for preventing information disclosure according to an example embodiment of the present application. In addition to the modules shown in FIG. 11, the server may also comprise a second receiving module 505, configured to receive a locking password inputted by the user before the first receiving module 501 receives the command sent by the user for clearing and/or erasing the user information in the mobile terminal, wherein the locking password may be used for locking the mobile terminal.

Figure 13:
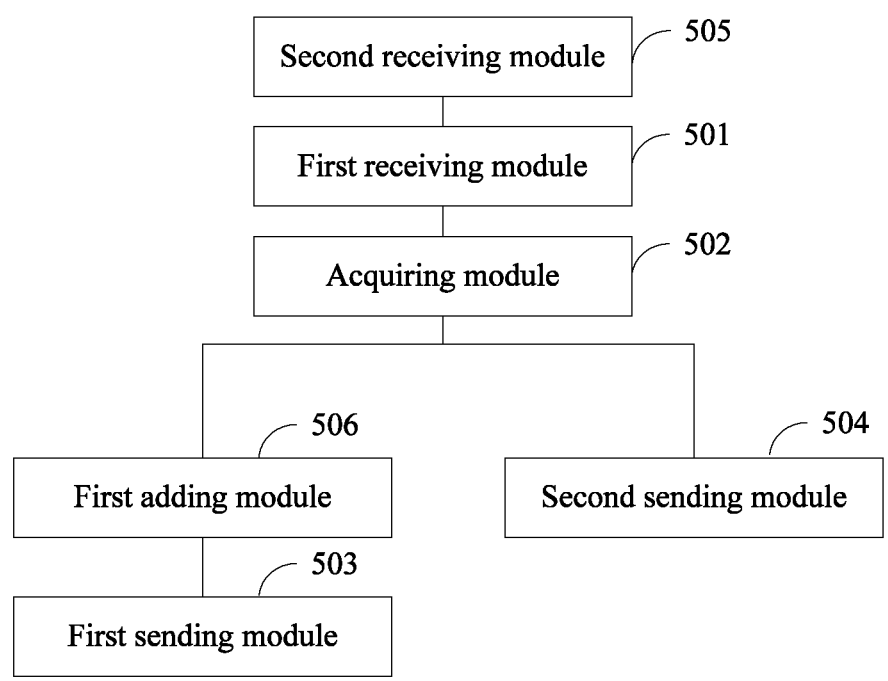
FIG. 13 illustrates a fourth schematic diagram of the server for preventing information disclosure according to the example embodiments of the present application.

FIG. 13 illustrates a fourth schematic diagram of the server for preventing information disclosure according to an example embodiment of the present application. In addition to the modules shown in FIG. 12, the server may also comprise a first adding module 506, configured to add the locking password into the first short message in a format pre-arranged and/or pre-defined with the mobile terminal before the first sending module 503 sends the first short message pre-arranged and/or pre-defined with the mobile terminal to the mobile terminal through the short message network.

Figure 14:
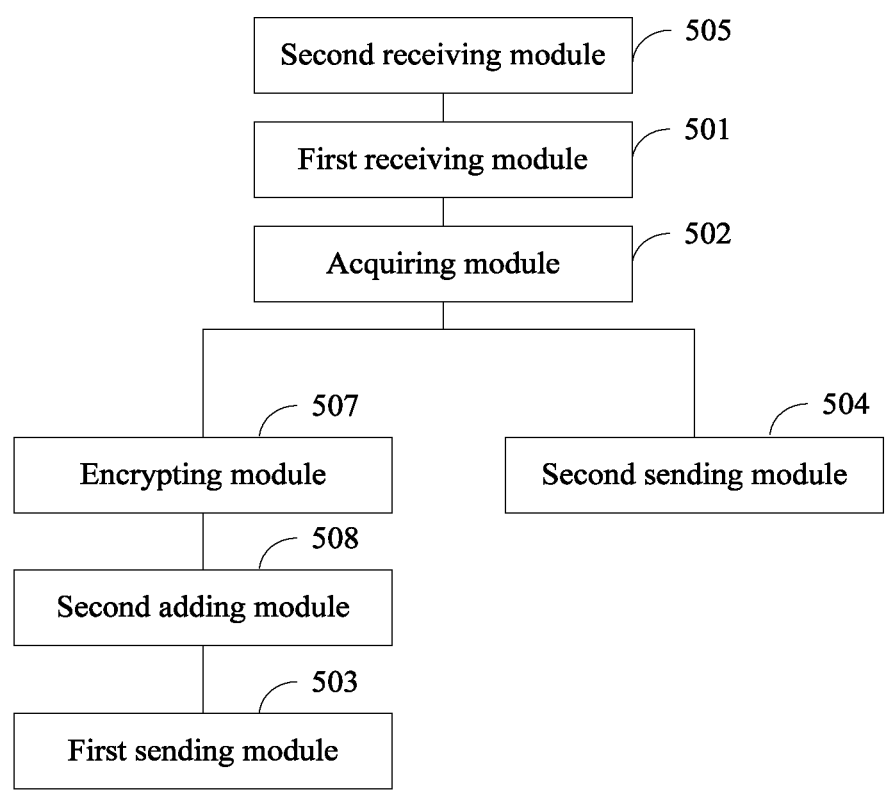
FIG. 14 illustrates a fifth schematic diagram of the server for preventing information disclosure according to the example embodiments of the present application.

FIG. 14 illustrates a fifth schematic diagram of the server for preventing information disclosure according to an example embodiment of the present application. In addition to the modules shown in FIG. 12, the server may also comprise an encrypting module 507, configured to implement encryption operations on the locking password so as to obtain a ciphertext corresponding to the locking password before the first sending module 503 sends the first short message pre-arranged and/or pre-defined with the mobile terminal to the mobile terminal through the short message network. Additionally, the server may comprise a second adding module 508, configured to add the ciphertext corresponding to the locking password into the first short message in a format pre-arranged and/or pre-defined with the mobile terminal.

Figure 15:
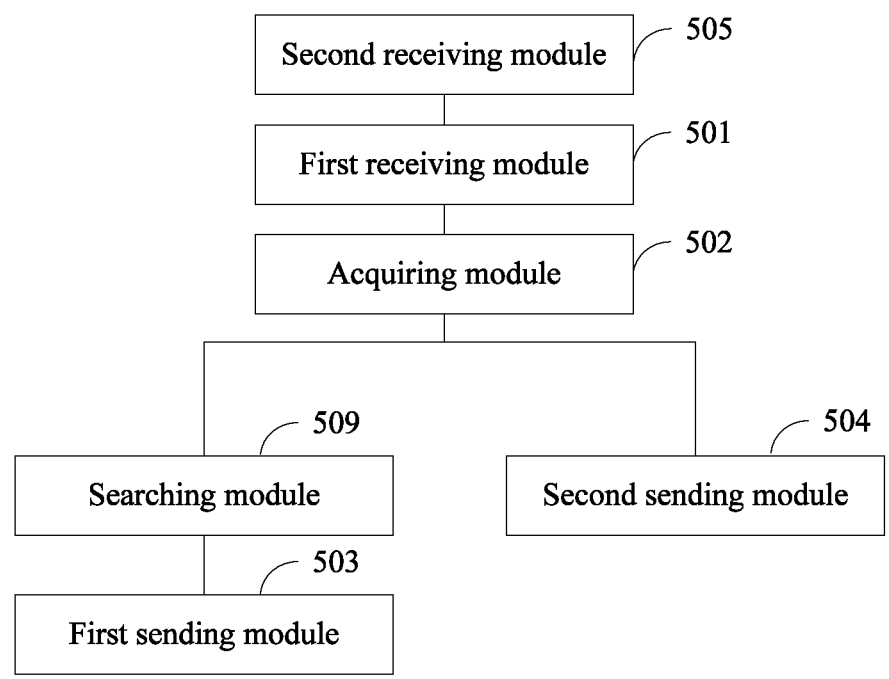
FIG. 15 illustrates a sixth schematic diagram of the server for preventing information disclosure according to the example embodiments of the present application.

FIG. 15 illustrates a sixth schematic diagram of the server for preventing information disclosure according to an example embodiment of the present application. In addition to the modules shown in FIG. 12, the server may also comprise a searching module 509, configured to search, according to identification information inputted by the user in advance, a telephone number corresponding to the identification information before the first sending module 503 sends the first short message pre-arranged and/or pre-defined with the mobile terminal to the mobile terminal through the short message network.

Figure 16:
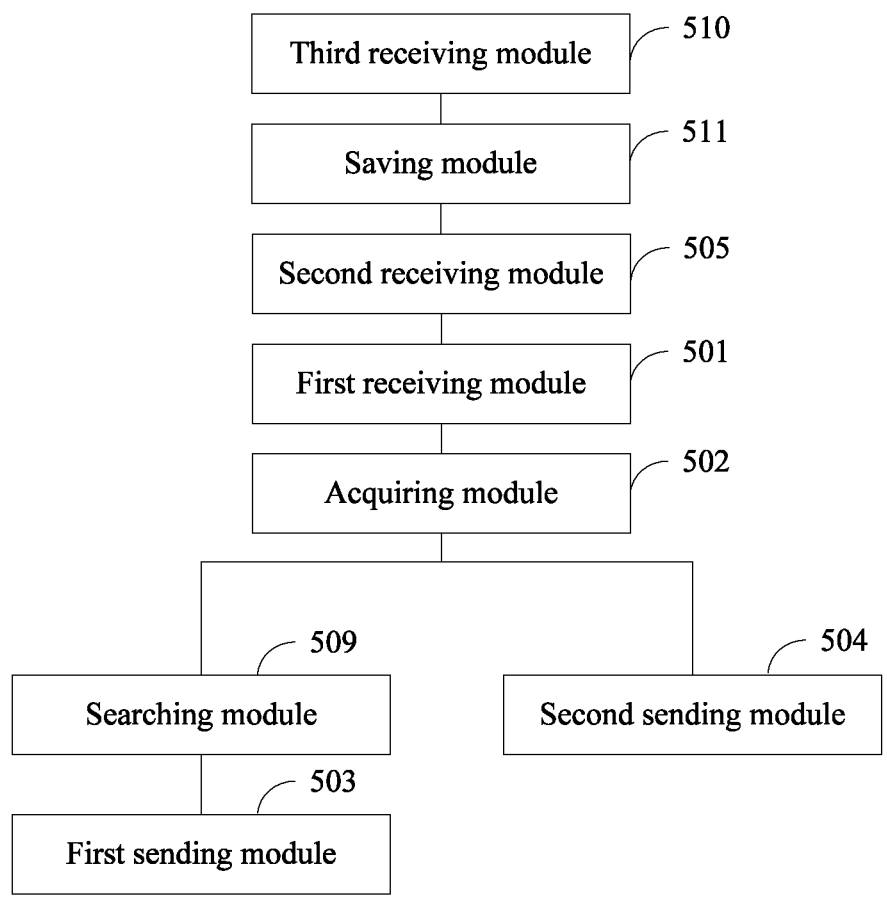
FIG. 16 illustrates a seventh schematic diagram of the server for preventing information disclosure according to the example embodiments of the present application.

FIG. 16 illustrates a seventh schematic diagram of the server for preventing information disclosure according to an example embodiment of the present application. In addition to the modules shown in FIG. 15, the server may also comprise a third receiving module 510, configured to receive the identification information inputted by the user and the identification of the mobile terminal (e.g., the telephone number of a mobile phone), and sending a verification message to the mobile terminal through the telephone number so as to verify the telephone number before the first receiving module 501 receives the command sent by the user for clearing and/or erasing the user information saved in the mobile terminal. Additionally, the server may comprise a saving module 511, configured to save a corresponding relationship between the identification information inputted by the user and the telephone number after the telephone number is verified.

Figure 17:
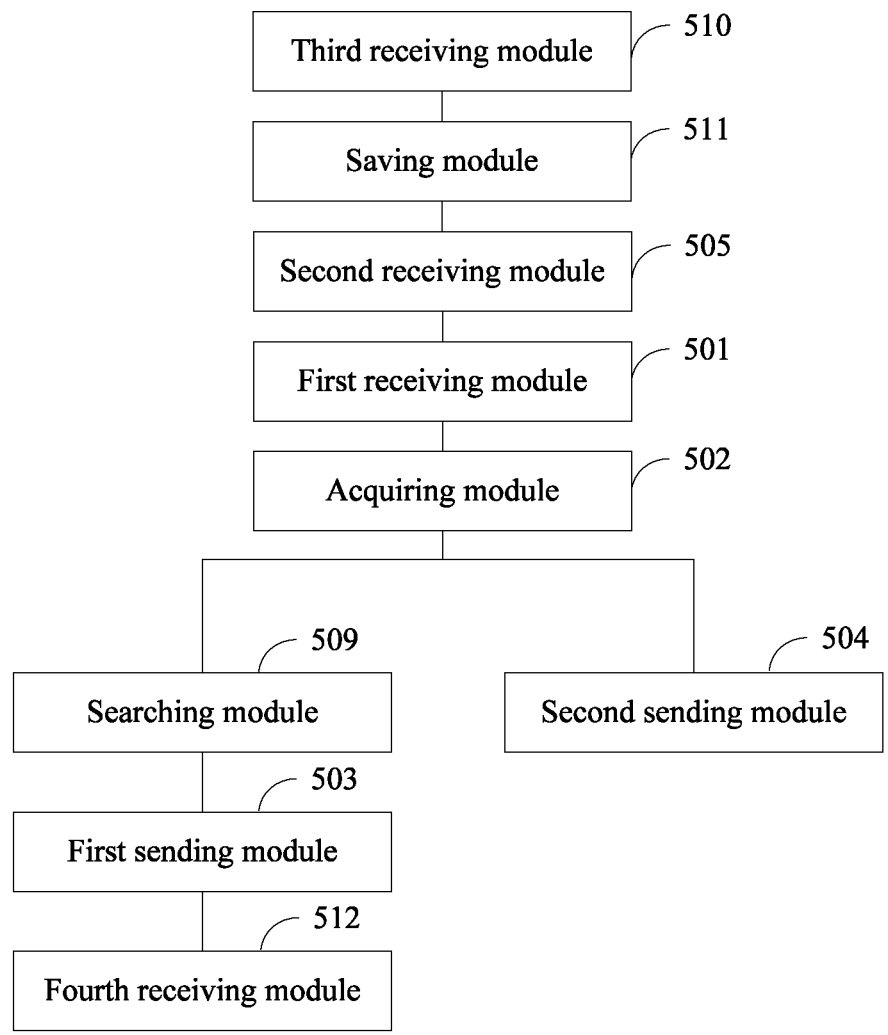
FIG. 17 illustrates an eighth schematic diagram of the server for preventing information disclosure according to the example embodiments of the present application.

FIG. 17 illustrates an eighth schematic diagram of the server for preventing information disclosure according to an example embodiment of the present application. In addition to the modules shown in FIG. 16, the server may also comprise a fourth receiving module 512, configured to receive position information of the mobile terminal sent by the mobile terminal after the first sending module 503 sends the first short message pre-arranged and/or pre-defined with the mobile terminal to the mobile terminal through the short message network.

In addition, example embodiments of the present application may further provide a system for preventing information disclosure. The system may comprise any device for preventing information disclosure and any server for preventing information disclosure described above.

The example embodiments of the present application may further provide an apparatus. The apparatus may comprise a display screen, one or a plurality of processors, a non-transitory processor-readable storage medium; and one or a plurality of modules. The one or plurality of modules may be stored in the storage medium and may be configured to be executed by the one or plurality of processors to perform the acts of determining whether a short message is a first short message pre-arranged and/or pre-defined with a server when the short message is received by the apparatus; and clearing and/or erasing user information in the apparatus when the short message is the first short message.

Further, clearing and/or erasing the user information in the apparatus may comprise deleting the user information locally saved in the apparatus; and formatting a memory card connected with the apparatus.

The first short message may carry a locking password set by the user or a ciphertext corresponding to the locking password set by the user.

Accordingly, the apparatus may be configured to have the functions as follows: when the short message is the first short message, locking the apparatus to make the apparatus before receiving and successfully verifying the locking password inputted by the user is under an unavailable state. Alternatively, when the apparatus is connected with an Internet network, receiving a first command sent by the server through the Internet network; and clearing and/or erasing the user information in the mobile terminal after receiving the first command sent by the server through the Internet network, wherein the first command may be used for instructing the apparatus to clear the user information.

Further, the apparatus may be configured to have the functions of making a sound from the apparatus when determining that the short message is the first short message; or reporting position information of the apparatus to the server when determining that the short message is the first short message.

Further, the first short message is not visible to the user.

The example embodiments of the present application may further provides an apparatus that comprises one or a plurality of processors; a storage; and one or a plurality of modules, wherein the one or plurality of modules may be stored in the storage and may be configured to be executed by the one or plurality of processors, wherein the one or plurality of modules may have the functions of receiving a command sent by a user for clearing and/or erasing user information in a mobile terminal; and establishing a network connected with the mobile terminal.

When the network connection is a short message network connection, a first short message pre-arranged and/or pre-defined with the mobile terminal may be sent to the mobile terminal through the short message network, so that the mobile terminal may execute an operation of clearing and/or erasing the user information in the mobile terminal.

Further, the apparatus may be configured to have the functions of sending a first command to the mobile terminal through an Internet network when the network connection is an Internet network connection. The first command may instruct the mobile terminal to execute the operation of clearing and/or erasing the user information in the mobile terminal.

Further, the apparatus may be configured to have the functions of receiving a locking password inputted by the user before receiving the command sent by the user for clearing and/or erasing the user information in the mobile terminal, wherein the locking password may be used for locking the mobile terminal.

Further, the apparatus may be configured to have the functions of adding the locking password into the first short message in a format pre-arranged and/or pre-defined with the mobile terminal before sending the first short message pre-arranged and/or pre-defined with the mobile terminal to the mobile terminal through the short message network.

Further, the apparatus may be configured to have the functions of implementing encryption operations on the locking password so as to obtain a ciphertext corresponding to the locking password before sending the first short message pre-arranged and/or pre-defined with the mobile terminal to the mobile terminal through the short message network; and adding the ciphertext corresponding to the locking password into the first short message in a format pre-arranged and/or pre-defined with the mobile terminal.

Further, the apparatus may be configured to have the functions of searching, according to identification information inputted by the user in advance, a telephone number corresponding to the identification information before sending the first short message pre-arranged and/or pre-defined with the mobile terminal to the mobile terminal through the short message network.

Further, the apparatus may be configured to have the functions of receiving the identification information inputted by the user and the telephone number, and sending a verification message to the mobile terminal through the telephone number so as to verify the telephone number before receiving the command sent by the user for clearing and/or erasing the user information in the mobile terminal; and saving a corresponding relationship between the identification information inputted by the user and the telephone number after the telephone number is verified.

Further, the apparatus may be configured to have the functions of receiving position information of the mobile terminal sent by the mobile terminal after sending the first short message pre-arranged and/or pre-defined with the mobile terminal to the mobile terminal through the short message network.

In addition, the example embodiments of the present application further provides a non-transitory processor-readable storage medium, wherein one or a plurality of modules may be stored in the storage medium. Each module may comprise a set of instructions for protecting user information in a mobile terminal. When the one or plurality of modules is applied in an mobile terminal provided with one or a plurality of processors, the apparatus may have the functions of judging whether a short message is a first short message pre-arranged and/or pre-defined with a server when the short message is received by the apparatus; and clearing and/or erasing user information in the apparatus when the short message is the first short message.

Further, clearing and/or erasing the user information in the apparatus particularly may comprise deleting the user information locally saved in the apparatus; and formatting a memory card connected with the apparatus.

Further, a locking password set by the user or a ciphertext corresponding to the locking password set by the user may be carried in the first short message.

Accordingly, the one or plurality of modules may have the functions as follows: when the short message is the first short message, locking the apparatus to make the apparatus before receiving and successfully verifying the locking password inputted by the user is under an unavailable state; alternatively, when the apparatus is connected with an Internet network, receiving a first command sent by the server through the Internet network; and clearing and/or erasing the user information in the mobile terminal after receiving the first command sent by the server through the Internet network, wherein the first command is used for instructing the apparatus to clear the user information.

Further, the one or plurality of modules may have the functions of making a sound from the mobile terminal when determining that the short message is the first short message; or reporting position information of the apparatus to the server when judging that the short message is the first short message.

Further, the first short message is not visible to the user.

The example embodiments of the present application may further provide a non-transitory processor-readable storage medium, wherein one or a plurality of modules may be stored in the storage medium; when the one or plurality of modules are applied in an server provided with one or a plurality of processors, the apparatus may have the functions of receiving a command sent by a user for clearing and/or erasing user information in a mobile terminal; and acquiring a type of a network connected with the mobile terminal.

When the mobile terminal is acquired to be connected with the short message network, a first short message pre-arranged and/or pre-defined with the mobile terminal may be sent to the mobile terminal through the short message network, so that the mobile terminal may execute an operation of clearing and/or erasing the user information in the mobile terminal.

Further, the one or plurality of modules may have the functions of sending a first command to the mobile terminal through an Internet network when the Internet network is acquired to be connected with the mobile terminal, so that the mobile terminal may execute the operation of clearing and/or erasing the user information in the mobile terminal after receiving the first command.

Further, the one or plurality of modules may have the functions of receiving a locking password inputted by the user before receiving the command sent by the user for clearing and/or erasing the user information in the mobile terminal, wherein the locking password is used for locking the mobile terminal.

Further, the one or plurality of modules may have the functions of adding the locking password into the first short message in a format pre-arranged and/or pre-defined with the mobile terminal before sending the first short message pre-arranged and/or pre-defined with the mobile terminal to the mobile terminal through the short message network.

Further, the one or plurality of modules may have the functions of implementing encryption operations on the locking password so as to obtain a ciphertext corresponding to the locking password before sending the first short message pre-arranged and/or pre-defined with the mobile terminal to the mobile terminal through the short message network; and adding the ciphertext corresponding to the locking password into the first short message in a format pre-arranged and/or pre-defined with the mobile terminal.

Further, the one or plurality of modules may have the functions of searching, according to identification information inputted by the user in advance, a telephone number corresponding to the identification information before sending the first short message pre-arranged and/or pre-defined with the mobile terminal to the mobile terminal through the short message network.

Further, the one or plurality of modules may have the functions of receiving the identification information inputted by the user and the telephone number, and sending a verification message to the mobile terminal through the telephone number so as to verify the telephone number before receiving the command sent by the user for clearing and/or erasing the user information in the mobile terminal; and saving a corresponding relationship between the identification information inputted by the user and the telephone number after the telephone number is verified.

Further, the one or plurality of modules may have the functions of receiving position information of the mobile terminal sent by the mobile terminal after sending the first short message pre-arranged and/or pre-defined with the mobile terminal to the mobile terminal through the short message network.

According to the method, devices, servers, systems and apparatuses for preventing information disclosure provided by the present application, after a mobile terminal of the user is lost, a first short message may be sent to the mobile terminal through the short message network; and when the mobile terminal determines that the received short message is the first short message, the user information in the mobile terminal may be erased; in this way, the security of the personal privacy information of the user may be guaranteed, and the personal privacy information stored in the mobile terminal may be prevented from being maliciously disclosed after the mobile terminal of the user is lost.

Through the above descriptions to the example embodiments, a person skilled in the art of this field may clearly know that the example embodiments of the present application may be implemented by hardware, and may further be implemented through software and one or more necessary universal hardware platforms. Based on this understanding, the technical scheme of the example embodiments of the present application may be shown by means of a software product, which may be stored in a non-transitory processor-readable storage medium (it may be a CD-ROM (Compact Disc Read-Only Memory), U disk, mobile hard disk drive, etc.), and comprise a plurality of instructions used for executing the methods of each example embodiment of the present application by a computer apparatus. Here, the computer may be any type of electrical computational device, such as a personal computer (e.g., a laptop, a desktop, etc.), a server, a tablet, a mobile phone (e.g., a featured cell phone and a smartphone), and/or a personal digital assistance (PDA), etc. the computer may also be the electrical computation part of any other device, such as the electrical computation part of a camera, a GPS device, and/or a motor vehicle, etc. In an even broader sense, the term computer used here may be any electrical designs that are capable of operating programs and processing data by a processor.

The person skilled in the art of this field may understand that a mobile terminal may comprise one processor or more than one processor. Thus actions performed by one processor may also be jointly performed by multiple processors. Similarly, a server may comprise one or more than one central processing unit. Thus actions performed by one central processing unit may be jointly performed by multiple central processing units.

The person skilled in the art of this field may understand that the drawings are only schematic diagrams of preferred example embodiments; and modules or flows in the drawings may or may not be required by implementing the present application.

The person skilled in the art of this field may understand that the modules in the apparatus in the example embodiments may be distributed in the apparatus in the example embodiments as described in the example embodiments, and may further be changed and arranged in one or a plurality of apparatuses different from the example embodiments. The modules of the example embodiments may be combined into one module, and may further be divided into a plurality of sub-modules.

The serial numbers of the example embodiments of the present application are for descriptions only, but not intended to represent the advantages and disadvantages of the example embodiments.

It should be clear that the person skilled in the art of this field may make any alternation and deformation on the present application within the spirit and scope of the present application. Thus, if these modifications and deformations of the present application belong to the scopes of the claims of the present application and equivalent arts, the present application intends to include these modifications and deformations.

We claim:

1. A computer server system, comprising:
at least one non-transitory storage medium comprising a set of instructions for preventing information disclosure from a mobile terminal;
an executing unit in communication with the storage medium, wherein when executing the set of instructions stored in the storage medium the executing unit is directed to perform a multiple protection procedure in the mobile terminal to:
receive a command from a user to lock the mobile terminal;
determine whether the mobile terminal is in connection with an Internet connection network;
when the mobile terminal is in connection with the Internet connection network, send an instruction in a first data format to the mobile terminal through the Internet connection network to lock the mobile terminal in a state unavailable for any operation other than receiving and verifying an unlocking password; and when the mobile terminal is not in connection with the Internet connection network, send the instruction in a second data format to the mobile terminal through a short message network that is different from the Internet connection network, wherein the second data format is a short message service (SMS) data format.

2. The computer server system according to claim 1, wherein the first data format of the instruction is a predefined Internet command.

3. The computer server system according to claim 1, wherein the instruction comprises at least one of a locking password or a ciphertext corresponding to the locking password.

4. The computer server system according to claim 3, wherein the locking password is same as the unlocking password.

5. The computer server system according to claim 1, wherein the instruction is further configured to instruct the mobile terminal to erase information predetermined by the user and stored in the mobile terminal.

6. The computer server system according to claim 1, wherein the instruction is further configured to instruct the mobile terminal to erase a predetermined portion of information stored in the mobile terminal.

7. A method for performing a multiple protection procedure to prevent information disclosure from a mobile terminal, comprising:
receiving, by a computer server system, a command from a user to lock the mobile terminal;
determining, by the computer server system, whether the mobile terminal is in connection with an Internet connection network;
when the mobile terminal is in connection with the Internet connection network, sending, by the computer server system, an instruction in a first data format to the mobile terminal through the Internet connection network to lock the mobile terminal in a state unavailable for any operation other than receiving and verifying an unlocking password; and
when the mobile terminal is not in connection with the Internet connection network, sending, by the computer server system, the instruction in a second data format to the mobile terminal through a short message network that is different from the Internet connection network, wherein the second data format is a short message service (SMS) data format.

8. The method according to claim 7, wherein the first data format of the instruction is a predefined Internet command.

9. The method according to claim 7, wherein the instruction comprises at least one of a locking password or a ciphertext corresponding to the locking password.

10. The method according to claim 7, wherein the locking password is same as the unlocking password.

11. The method according to claim 7, wherein the instruction is further configured to instruct the mobile terminal to erase information predetermined by the user and stored in the mobile terminal.

12. The method according to claim 7, wherein the instruction is further configured to instruct the mobile terminal to erase a predetermined portion of information stored in the mobile terminal.

13. A mobile terminal, comprising:
at least one non-transitory storage medium comprising a set of instructions for preventing information disclosure;
an executing unit in communication with the storage medium, wherein when executing the set of instructions the at least one executing unit is directed to perform a multiple protection procedure to:
connect to at least one of an Internet connection network and a short message network, wherein the short message network that is different from the Internet connection network;
when the Internet connection network is connected, receive through the Internet connection network an instruction in a first data format to lock the mobile terminal;
when the Internet connection network is not connected, receive through the short message network the instruction in a second data format to lock the mobile terminal; and
lock the mobile terminal in a state unavailable for any operation other than receiving and verifying an unlocking password according to the instruction.

14. The mobile terminal according to claim 13, wherein the instruction in the first data format is a predefined Internet command.

15. The mobile terminal according to claim 13, wherein the executing unit is further directed to erase at least one of
information predetermined by the user and stored in the mobile terminal according to the instruction; or
a predetermined portion of information stored in the mobile terminal.

16. The mobile terminal according to claim 13, wherein the mobile terminal does not include a SIM card.

17. A method for performing a multiple protection procedure to prevent information disclosure from a mobile terminal, comprising:
connecting, by the mobile terminal, to at least one of an Internet connection network and a short message network, wherein the short message network that is different from the Internet connection network;
when the Internet connection network is connected, receiving, by the mobile terminal through the Internet connection network, an instruction in a first data format to lock the mobile terminal;
when the Internet connection network is not connected, receiving, by the mobile terminal through the short message network, the instruction in a second data format to lock the mobile terminal; and
locking, by the mobile terminal, the mobile terminal in a state unavailable for any operation other than receiving and verifying an unlocking password according to the instruction.

18. The method according to claim 17, wherein the instruction in the first form is a predefined Internet command.

19. The method according to claim 17, further comprising erasing at least one of
information predetermined by the user and stored in the mobile terminal according to the instruction; or
a predetermined portion of information stored in the mobile terminal.

20. The method according to claim 17, wherein the mobile terminal does not include a SIM card.

* * * * *